Patented Aug. 4, 1953

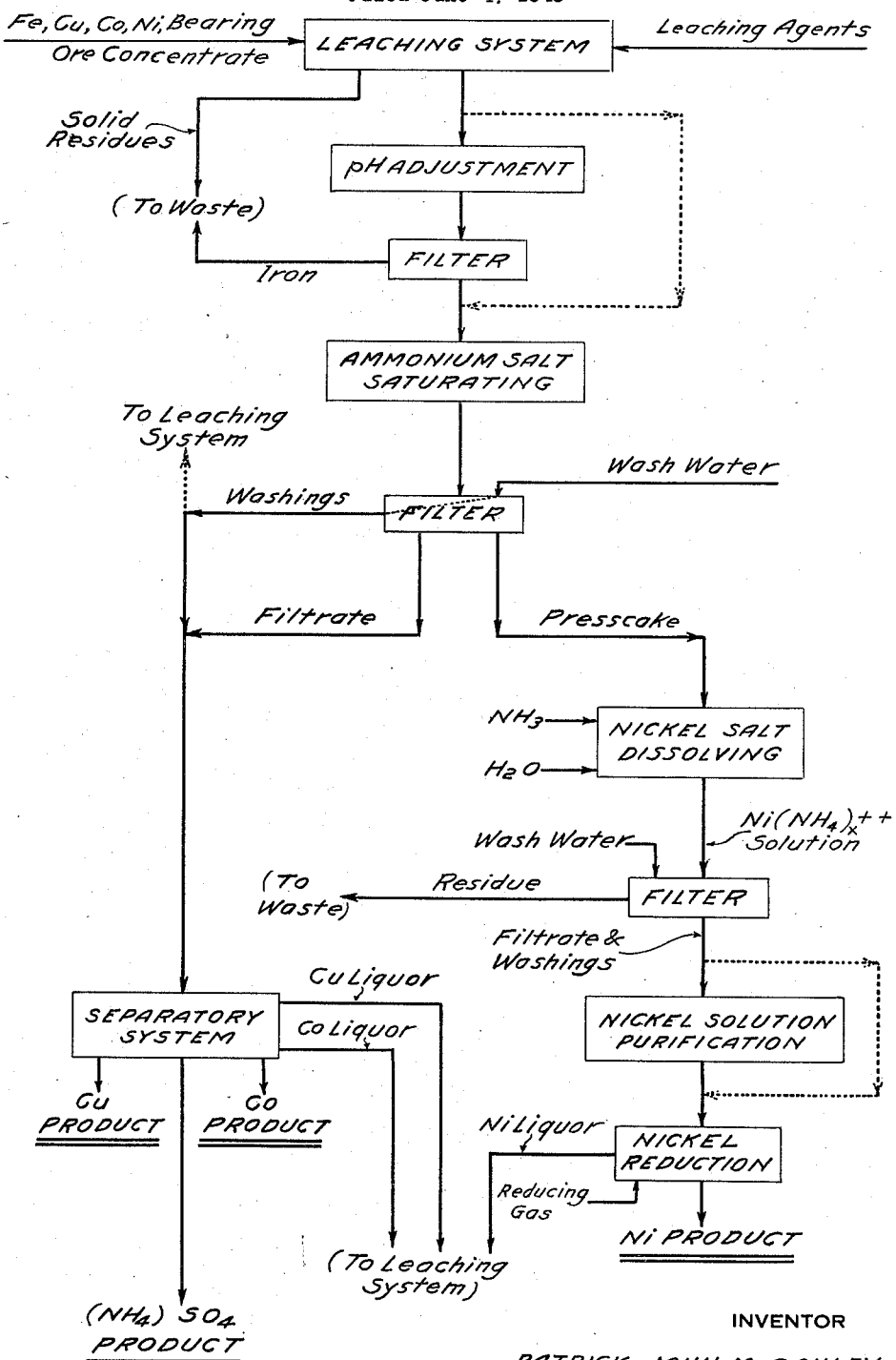

2,647,828

UNITED STATES PATENT OFFICE 2,647,828

RECOVERY OF Ni FROM AMMONIA LIQUORS

Patrick J. McGauley, Glen Cove, N. Y., assignor to Chemical Construction Corporation, New York, N. Y., a corporation of Delaware Application June 4, 1949, Serial No. 97,227

4 Claims. (Cl. 75—103)

This invention is concerned with the production of metallic nickel. It is particularly concerned with the leaching treatment of ore concentrates containing nickel, and copper, iron and cobalt, whereby a solution of soluble nickel salts is obtained and the precipitation of metallic nickel powder from such solution.

Although ores of nickel-bearing minerals are not uncommon, the presently-available, commercially-adaptable methods of isolating their nickel content and the subsequent conversion thereof to metallic nickel are not wholly satisfactory. Not all have adequate provision to handle iron which is present in most ores. In some cases the quality and/or yield of the product is not as high as may be desired. In almost all such procedures the economics of the necessary operations result in relatively high costs.

It is, therefore, the principal object of the present invention to devise a simple and straightforward production of metallic nickel in which the quality of the product is sufficiently high to meet commercial qualifications without utilizing the undesirable steps found in current operations. Such a process should not be dependent upon any particular type of ore. It should not require roasting and/or electrical precipitation. It should not require excessively complicated process steps, unusual reagents or extraordinary equipment.

In general, the process requirements of the present invention have been met in a simple straightforward operation. A suitable nickel-bearing ore is leached by any suitable method to place the nickel content thereof in solution. The nickel content thereof is isolated by precipitation as a nickel-ammonium double salt, the double salt is redissolved, and the nickel content of the solution is converted to a nickel-ammonium complex salt, and the nickel content of the resultant solution is precipitated as nickel powder by chemical reduction.

While, as noted above, nickel-bearing ores are not too uncommon, an ore in which nickel is the sole or even the predominant metal-bearing constituent is very rare. Accordingly, the treatment of mixed mineral ores will be discussed as illustrative of the application of the present invention. The largest proportion of most ores is usually some gangue diluent. Consequently, the ore is usually treated by some preliminary concentration such as gravity separation and/or froth flotation and the like to eliminate the bulk of the gangue. Such procedures form an art with which the present invention is not concerned. In the instant application, it is assumed that some such operation has been carried out and it is the resultant concentrate which is to be treated.

In addition to the gangue diluents, most nickel-bearing concentrates usually contain additional metals, among which are commonly found copper, iron and cobalt. Any of these, including the nickel, may be present as sulfides, usually in some complex form. However, one or more of the metals may be present as an oxidized mineral. Because the problems involved are typical, a concentrate containing copper, iron, cobalt and nickel will be used as illustrative in this discussion.

In order to more easily understand the flow of the present invention, reference is made to the accompanying drawing. The latter constitutes a simplified flowsheet showing the major steps with which the present invention is concerned and their relation to the treatment of the remainder of the liquor obtained by leaching the ore concentrate.

Leaching procedures to place the metal values of an ore concentrate in solution also form an art which is highly developed. So far as the metallic nickel preparation of the present invention is concerned, the exact leaching procedure may be widely varied. Perhaps the most common procedures involve either acid or ammoniacal leaching. Either may be used in a known manner with or without concurrent oxidation, depending upon the oxides and sulfides content of the ore being treated. In acid leaching, the acid is generally sulfuric and ferric sulfate is often added therewith. Ammoniacal leach liquors often also contain ammonium salts such as the carbonate and complex metal-ammonium ions. The present invention is applicable to an ore being treated by any of such procedures.

Because the invention is not limited to a particular type of leaching, in the drawing this operation has been designated generically as a "leaching system." Actually, the leaching is ordinarily carried out in some multiple tank system, the exact arrangement of which is not a critical factor in the process of this application. The copper-, iron-, cobalt-, and nickel-bearing concentrate is fed thereto. It is treated therein with one or more suitable leaching agents. These may be any suitable acid or ammoniacal leaching liquors, used in a known manner as was noted above.

The residual barren solids may be passed to waste. In most cases they will contain the gangue diluents. In addition, where ammoniacal or other leaching liquors of high pH are used, the iron minerals not affected by the treatment will report here. Any iron minerals which may have been oxidized also will be present as ferric oxide or hydroxide, insoluble at the high leaching pH of an ammoniacal treatment and will also report here.

A leach liquor containing the dissolved metal values is drawn from the leaching system. In using most types of acid leaching, particularly where oxidation is employed, there will be a considerable content of dissolved iron. Where dissolved iron salts are present, they must be eliminated from the solution. It was found that the iron can be caused to precipitate from a concentrated ammonium salt solution at a suitable pH while keeping the metal values in solution.

Accordingly, the pH of the pregnant leach liquor is adjusted to about 3 to 4. Because of the oxidation, which is a normal step of average operation up to this point, any dissolved iron will be principally in the ferric condition. At these pH's, it will precipitate and may be filtered out as oxide or hydroxide and passed to waste. Neutralization may be carried out in any desired manner. For example, it may be done by the addition of ammonia to a sulfuric acid leach liquor or by the addition of sulfuric acid to, or by oxidation formation of sulfuric acid in situ in, an ammoniacal leach liquor. Where the problem of iron is not involved, this step of pH adjustment and the removal of the resultant iron precipitate may be eliminated if so desired. This omission is indicated in the flowsheet by an optional flow.

Further, in accordance with the work done in developing the present invention, it was found that at a pH of about 4.0 to about 6.4, in a concentrated solution of ammonium sulfate, the nickel content of the solution can be precipitated quantitatively as a nickel sulfate-ammonium sulfate double salt. At the same time other metals, i. e., the cobalt and copper in the illustrative case, can be retained in solution. Accordingly, the iron-free, metals-bearing leach liquor is treated to bring it into this condition.

Whether a sulfuric acid leach or an ammoniacal leach is used, any pH adjustment, i. e., that performed previously to remove iron and/or that done at this point to precipitate the nickel double salt, will result in the formation of a considerable amount of ammonium sulfate. This amount usually will be sufficient for the purposes of the present invention. If not, additional preformed ammonium sulfate may be added. This latter causes no particular problem since, as will be brought out below, ammonium sulfate is one of the usual products of the overall process of treating the ore concentrate.

The resultant slurry of the double salt is filtered to recover the latter. Ordinarily, the presscake is washed. The washings may be either added to the filtrate or, if so desired, optionally returned to the leaching system. The filtrate and the double salt presscake are separately treated. The nickel values, with which the present invention is concerned, are contained in the latter.

The filtrate, which in the illustrative case will contain the copper and cobalt values as well as the ammonium sulfate, is sent to a separatory system. The latter, in its specific details, forms no part of the present invention. Accordingly, it has been generically indicated as a "separatory system." So far as the present invention is concerned, it is sufficient to note that such a system ordinarily produces five products. In most cases these are: (1) a copper product, usually as copper metal powder; (2) a cobalt product, usually as cobalt metal powder; (3) ammonium sulfate crystals; (4) a copper-bearing mother liquor; and (5) a cobalt-bearing mother liquor. These latter two liquors are ordinarily returned to the leaching system. An excellent separatory system for the purposes of the present invention is shown in my copending application for United States Letters Patent, Serial No. 97,228, filed of even date. However, any desirable system may be used so far as the present application is concerned.

Returning to the principal flow of the present application, the nickel-bearing presscake, which is constituted principally by the double salt, is given the following treatment. Initially the double salt is redissolved. To accomplish this, a sufficient amount of water and ammonia is added to convert the nickel to the nickel-ammonium complex salt, in the illustrative case the sulfate. The resultant solution is filtered and the solid residue, if any, is passed to waste.

The filtrate and washings which contain the dissolved nickel-ammonium salt is purified, if necessary. For example, barium or calcium oxide may be added in sufficient amount to precipitate the sulfate content of any ammonium sulfate in the liquor, the precipitated alkaline-earth metal sulfate being filtered out. If so desired, the nickel-ammonium salt, either per se or after conversion to nickel sulfate, may be purified by crystallization and then be redissolved. In the latter case, sufficient ammonia is added to convert the nickel to a nickel-ammonium complex salt. If, for any reason, the purification step is not required, it may be bypassed. Ordinarily, however, since the purity of the final metal product is of great importance commercially, and the best product can be obtained only from relatively pure solutions, some purification of nickel solution may be desirable as a precaution.

Finally, the nickel-ammonium solution is treated to precipitate the nickel content thereof. This is accomplished under increased temperature and pressure conditions in the presence of a reducing gas such as carbon monoxide. It should be noted that successful precipitation cannot be accomplished if the hydrogen ion concentration of the solution is allowed to increase appreciably. According to the present invention, it is therefore preferable to precipitate from a nickel-ammonium complex salt solution. Where the latter is impractical or undesirable, other means should be provided to eliminate the hydrogen ions formed during reduction. Reduction, i. e., precipitation, is carried out at any convenient temperature and pressure, depending upon the time cycle required. The average operating conditions will be found to lie within a temperature range of about 100–325° C., although higher temperatures may be used if apparatus of sufficient strength is available.

Precipitation is carried as nearly to completion as is consistent with the purity of the metal product. The latter, with the exception of oxides, should be substantially pure nickel. Except for a possible small oxide content, it is easily possible to precipitate powdered nickel having a purity of about 99.0%, or better, which is well within commercial requirements. To insure this condition, precipitation should not be carried out beyond the point at which the ratio of nickel to any other extraneous metal ions approaches a 1:1 ratio. Ordinarily this will not present a serious problem. Substantially all the nickel usually can be precipitated. This is not a source of any loss of nickel since the unprecipitated nickel mother liquor is recycled. Recycling is usually to the leach system but may be to any step prior to the purification step.

In crystallizing the nickel double salt it should be noted that the copper and/or cobalt salts must be retained in solution. It may, therefore, be necessary in some cases to take precautions that the cobalt-nickel and copper-nickel ratios do not exceed the limitations at which, for the ammonium sulfate content of the liquor, the cobalt and copper may be retained in solution.

Assigning numerical limitations within which limits the conditions must be maintained is not readily done. At a pH above about 6.5 the $Ni^{++}$ ion becomes a nickel-ammonium complex such as the $Ni(NH_4)_x^{++}$ ion, where x varies from about 2–6, depending upon the available ammonia. Below a pH of about 4.0 the double salt does not form. In the case of cobalt, the corresponding pH values are about 5.5 and 3.5 respectively. It is necessary for best results that the double salt be precipitated under these conditions.

As to the amount of ammonium sulfate which should be in solution the limits are obviously effected by the temperature. If about 25° C. is taken as illustrative, the nickel double salt is soluble to less than 1% by weight in a solution containing about 9–10% ammonium sulfate and is insoluble in solutions of more than about 20% ammonium sulfate. At these ammonium salt concentrations, the cobalt is soluble from about 6% down to about 1.5% respectively, and the copper salt from about 10% down to about 2%.

Obviously the solubility of cobalt and copper decreases with increasing ammonium salt concentration. At the same illustrative temperature, cobalt double salt, for example, becomes insoluble at about 40% ammonium salt concentration but copper remains soluble in appreciative amounts to about 50% ammonium salt concentration. Accordingly, it is desirable that the nickel double salt precipitation be carried out at ammonium salt concentrations not much above the minimum at which nickel salt is insoluble. In this way the maximum permissible copper and cobalt concentrations can be maintained. In some cases the cobalt and/or copper to nickel ratios may be higher than the solubility curve will permit the cobalt and copper content to be wholly retained in solution, while the nickel is being precipitated. In such cases the liquor is diluted with respect to the copper and/or cobalt content sufficiently to retain these metals in solution. Dilution will ordinarily be made by recycling barren liquor from which copper and/or cobalt has been removed in the separatory system. If necessary, an ammonium salt concentration adjustment can be made after dilution.

I claim:

1. The treatment of a liquor containing dissolved copper and nickel values to isolate the nickel values which includes the steps of: removing any solids from the liquor; producing in the liquor an ammonium sulfate concentration of from about 10% to about 40%; adjusting the copper content of the liquor to from not more than about 8% at a 10% ammonium sulfate concentration to not more than about 1% at a 40% ammonium sulfate concentration; adjusting the pH of the solids-free liquor to from about 4.0 to about 6.5 whereby all the copper values remain in solution but substantially all the nickel values are precipitated, and collecting said precipitate.

2. A process according to claim 1 in which said liquor contains ferric ions characterized in that prior to said first removal of solids from the liquor the pH thereof is adjusted to from about 3 to about 4 whereby the ferric iron precipitates, said precipitate being separated from the residual liquor before further pH adjustment.

3. The treatment of a liquor containing dissolved cobalt, nickel and copper values to isolate the nickel values which includes the steps of: removing any solids from the liquor; producing in the liquor an ammonium sulfate concentration of from about 10% to about 40%; adjusting the cobalt content of the liquor to from not more than about 5% at 10% ammonium sulfate concentration to not more than about 1.5% at a 40% ammonium sulfate concentration and the copper content of the solution to not more than 8% at a 10% ammonium sulfate concentration to not more than about 1% at a 40% ammonium sulfate concentration; adjusting the pH of the solids-free liquor to from about 4 to about 6.5 whereby substantially none of the cobalt and copper values but substantially all of the nickel values are precipitated, and collecting said precipitate.

4. A process according to claim 3, in which said liquor contains ferric ions characterized in that prior to the removal of solids from the liquor the pH thereof is adjusted to from about 3 to about 4 whereby the ferric iron precipitates, said precipitate being separated from said residual liquor before further pH adjustment.

PATRICK J. McGAULEY.

References Cited in the file of this patent

UNITED STATES PATENTS

| Number | Name | Date |
| --- | --- | --- |
| 1,039,861 | Wells | Oct. 1, 1912 |
| 1,686,391 | Muller et al. | Oct. 2, 1928 |
| 2,576,314 | Forward | Nov. 27, 1951 |

OTHER REFERENCES

"Solubilities of Inorganic and Organic Compounds," vol. 2, by Seidell, D. Van Nostrand Co., Inc. (1928), pages 1185 and 1186.

"Chemical News," vol. 7 (1863), page 185.

"Hydrogen Ions," by Britton, D. Van Nostrand Co., Inc. (1929), page 278.